Sept. 30, 1941. R. C. PIERCE 2,257,646
TIRE CASING
Filed Nov. 9, 1939 3 Sheets-Sheet 1
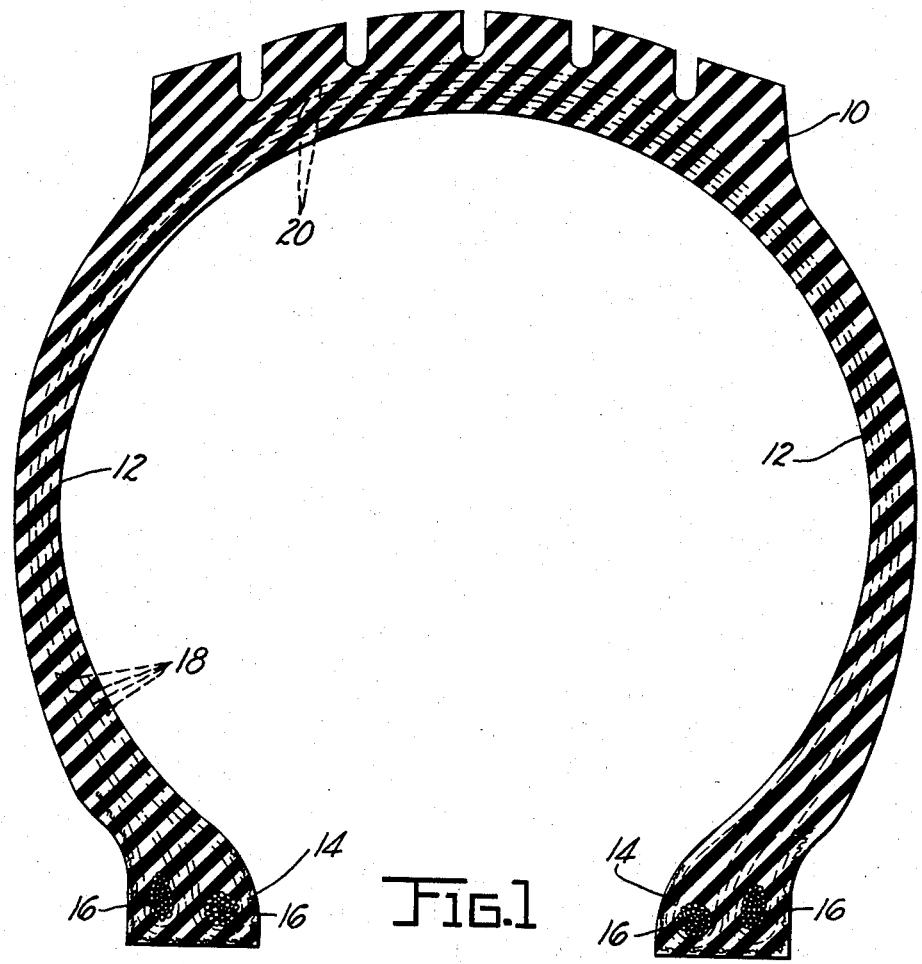
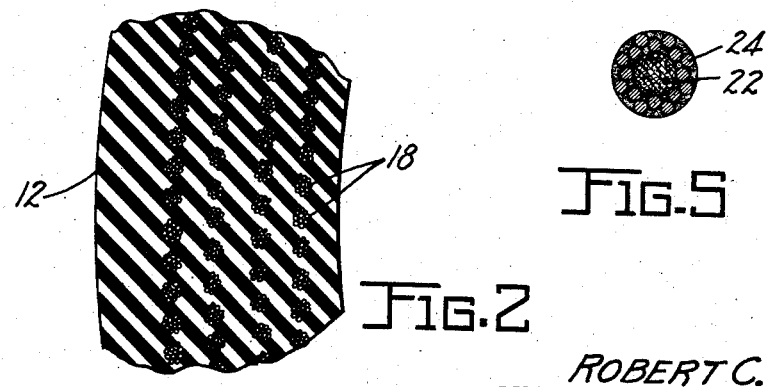
INVENTOR.
ROBERT C. PIERCE
BY Booth & MacDuff
ATTORNEYS.

Sept. 30, 1941.   R. C. PIERCE   2,257,646
TIRE CASING
Filed Nov. 9, 1939   3 Sheets—Sheet 2

INVENTOR.
ROBERT C. PIERCE
BY Booth & MacDuff
ATTORNEYS.

Sept. 30, 1941.  R. C. PIERCE  2,257,646
TIRE CASING
Filed Nov. 9, 1939  3 Sheets-Sheet 3
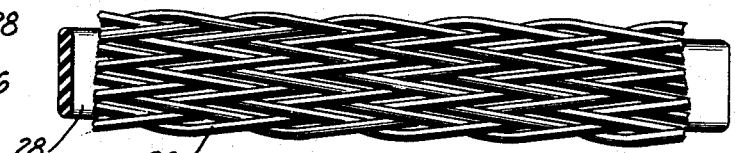
Fig. 7  Fig. 6
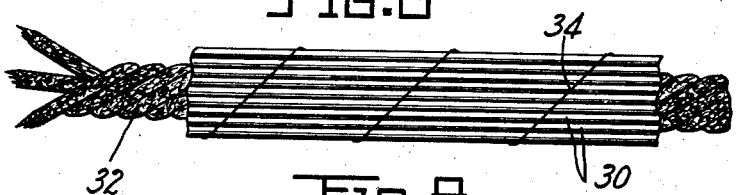
Fig. 8
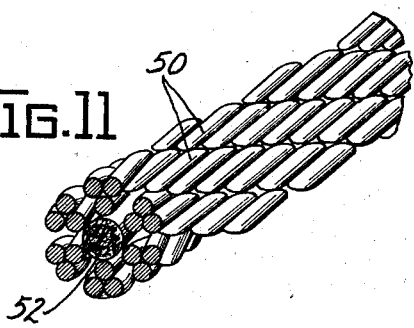
Fig. 11
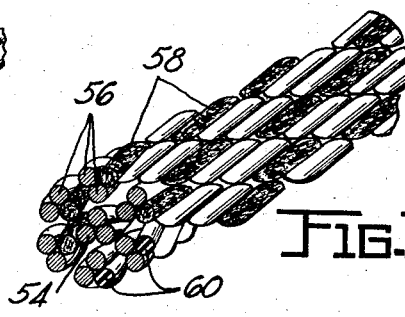
Fig. 12
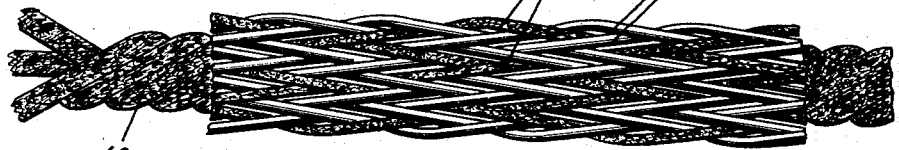
Fig. 9
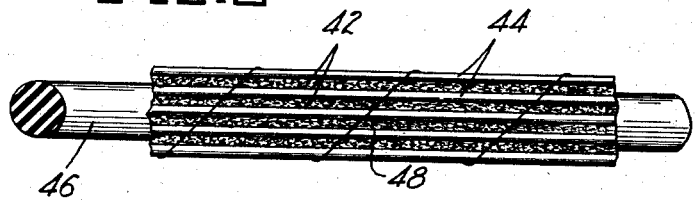
Fig. 10
INVENTOR.
ROBERT C. PIERCE
BY Booth & MacDuff
ATTORNEYS.

Patented Sept. 30, 1941

2,257,646

UNITED STATES PATENT OFFICE 2,257,646

TIRE CASING

Robert C. Pierce, Niles, Mich., assignor to National Standard Company, Niles, Mich., a corporation of Michigan Application November 9, 1939, Serial No. 303,599

4 Claims. (Cl. 152—358)

This invention relates to tire casings and more particularly to tire casings reinforced with tubular metallic reinforcing elements.

One of the objects of the invention is to provide a tire casing which has relatively thin flexible walls. This is made possible by the use of high strength metallic reinforcing elements which are themselves highly flexible.

Another object of the invention is to provide a tire casing reinforced by tubular metallic reinforcing elements in which the reinforcing elements are tightly bonded to the material of the casing. The tubular elements may be provided with cores to which the material of the casing is bonded through openings or spaces in the metallic construction.

Still another object of the invention is to provide a tire casing reinforced by tubular elements formed of metal wires or the like constructed in such a way as to be resilient in both tension and compression. This is a highly important feature and enables the tire casing to withstand shocks and to flex to a substantial extent without danger of breakage.

Yet another object of the invention is to provide a tire casing reinforced by metallic reinforcing elements which are compressible transversely. This facilitates calendering and provides a flexible tire.

The above and other objects, advantages and novel features of the invention will be apparent from the following description when read in connection with the accompanying drawings, in which:

Figure 1 is a section crosswise through a tire casing embodying the invention;

Figure 2 is a partial enlarged section of the casing side wall;

Figure 5 is a section of the element of Figure 4;

Figure 6 is a view similar to Figure 4 showing another reinforcing element construction;

Figure 7 is a transverse section of the element of Figure 6;

Figures 8, 9 and 10 are views similar to Figure 4 showing alternative reinforcing element constructions; and Figures 11 and 12 are enlarged perspective views of other types of reinforcing elements.

Figure 3:
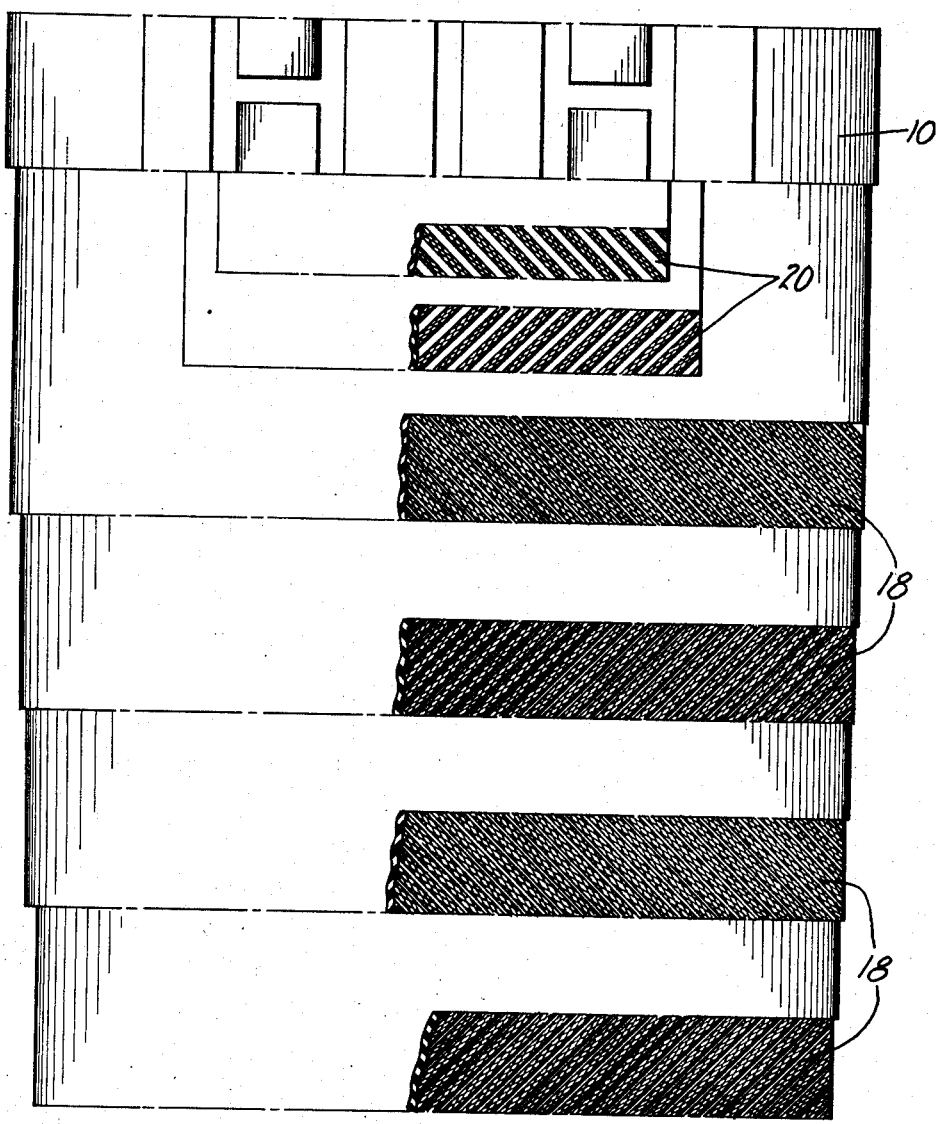
Figure 3 is a plan view of the tire with the various layers successively broken away.

The illustrated tire casing comprises a tread portion 10, side wall portions 12, and beads 14 reinforced by metallic reinforcing rings 16. The reinforcing ring 16 may be formed of braided metal wires or of various types of wire tapes or cables, as is well understood in the art.

According to the present invention the side wall and tread portions of the tire are reinforced by layers of metallic reinforcing elements, four such layers being shown at 18. The ends of the reinforcing elements are turned up around the bead reinforcements 16, so that the reinforcing elements 18 extend through the body of the tire casing from one bead to the other, and are securely anchored in the beads. As shown, two breaker strip layers, indicated at 20, are placed in the tread portion of the tire and extend across the outer part thereof.

In order for a tire to operate successfully to absorb the various road shocks and to be sufficiently flexible to withstand the repeated flexures required in service, it is desirable that the reinforcing elements employed in the tire have high tensile strength so that a relatively small number of layers of elements will provide the strength necessary to support the tire load without unduly increasing the wall thickness. It is also highly desirable that such elements be resilient both in tension and compression, so that they may stretch and compress as the tire is flexed, and that the elements be capable of bending on a relatively short radius so that turn-ups of small diameter may be provided.

The present invention provides a number of alternative tension elements having the necessary characteristics for successful tire construction. All of these constructions include a series of strand members arranged in annular array. In some cases a core member is employed and one or more of such members may be formed of non-metallic yielding material and the other members formed of metal wires. The non-metallic yielding material may be rubber, synthetic rubber or like plastic or fibrous material such as cotton, linen, hemp, rayon, silk, wool, jute, sisal or the like and the metal members are preferably high strength steel wires either straight or stranded on the order of .006" in diameter. The non-metallic material is preferably impregnated or coated with bonding material such as latex or rubber cement, and the metal wires may be plated with zinc and copper or coated with bonding lacquer to facilitate bonding of the tension elements to the rubber of the tire casing.

Figure 4:
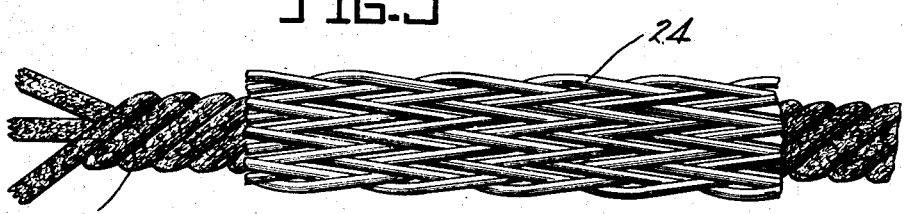
Figure 4 is an enlarged side view of a reinforcing element.

One such element, as shown in Figures 4 and 5, is formed with a yielding core 22 of fibrous material surrounded by a tubular braid 24 of metal wires braided closely around the core. The fibrous material may be a twisted or woven rope or may be laid in any other desired manner to provide a substantially circular core around which the wires may be braided.

In the illustrated braid, each wire passes alternately over and under two other wires, around the core throughout the length of the braid, but it will be understood that any other desired type of braid might be employed.

The core 22 is preferably coated or impregnated prior to braiding of the wires therearound with a bonding material, as described above. The tension elements so formed may then be imbedded in rubber by the usual calendering process or the like, and may be NS-72 utilized in the construction of tire casing in the same manner as is now generally employed in the construction of the usual cord tires.

Due to the much greater strength of the tension elements just described over the conventional fabric cords, a much smaller number of layers of tension elements may be employed than with fabric cords to provide a tire casing of the same strength. Tension elements of this type are resilient in both tension and compression, so that the tire casing may flex through relatively sharp angles without breaking. Also, due to the relatively open construction of the wires, the rubber of the tire casing will bond to the core through the interstices of the braid and will form a very strong connection between the tension elements and the rubber of the casing. This bonding is in addition to the chemical bond between the surface of the wires and the rubber of the casing, so that a very secure bond is formed holding the tension elements in place in the casing body. The bonding of the rubber to the core is facilitated during the calendering operation, due to the fact that the core and the braid are compressible diametrically. This greatly facilitates calendering and insures that the tension elements will be properly imbedded in the rubber.

Figure 6 illustrates an alternative construction similar to that of Figure 4 except that the wire braid 26 is formed around a core 28 of rubber, synthetic rubber, or similar plastic material. In the case of a rubber core, the rubber may first be completely cured and may be coated with a bonding material such as latex or rubber cement, similar bonding material also being employed when the core is formed of synthetic rubber or other plastic. Alternatively, the rubber core may be only partially cured prior to braiding of the wires thereon, and may be finally cured during curing of the tire casing. In either case, the rubber of the tire casing body will bond to the core through the interstices of the metal braid to provide a very secure bond between the casing body and the tension elements.

The core of Figure 6 is shown as being flattened, this feature being best seen in the section of Figure 7. It will be apparent that a tubular braid as shown may be made either circular or flat equally well or might be made circular and then flattened. The core may be formed of a rubber or plastic strip, a flat woven strip of wire or fabric, or strands of wire or fabric bonded together by rubber or the like.

Figure 8 illustrates an alternative construction in which a plurality of metal wires 30 are laid up in parallel in annular array around a yielding core 32. These wires may be of approximately the same size and of the same material as the wires forming the braid 24, and may, if desired, be laid either straight or with a slight twist. The core 32 may be round or flattened and is preferably impregnated or coated with a bonding material as discussed above, which may serve to hold the wires 30 in place thereon. However, if necessary or desirable, a binding cord 34 preferably formed of fibrous material may be wound spirally around the outside of the wires 30 to hold them in place on the core.

This element may be imbedded in the rubber of the tire casing in the same manner as described above for the elements of Figures 4 and 6 and the rubber of the casing will bond to the core around and between the wires 30, as well as to the surfaces of the wire to fasten the tension elements securely in the body of the casing.

Figure 9 illustrates still another construction similar to that of Figure 4 except that the tubular braid is formed of metal wires 36 and strands 38 of non-metallic yielding material braided around a yielding core 40. The strands 38 serve to cushion the wires 36 and are also preferably impregnated or coated with a bonding material to facilitate bonding of the tension element to the rubber of the tire casing. The core 40 preferably also carries bonding material so that it will be bonded to the rubber of the tire casing around and between the wires 36 and strands 38.

Figure 10 illustrates a construction similar to that of Figure 8 except that strands 42 of non-metallic yielding material are arranged between the metal wires 44 in annular array around a yielding core 46, shown as formed of rubber or like plastic material. In this construction, as in that of Figure 8, a binding cord 48 may be employed to hold the strands and wires in place on the core. Preferably both the strands 42 and the core 46 carry bonding material to facilitate bonding of the tension element to the rubber of the tire body.

Figure 11 illustrates a tension element made up in the form of wire rope or cable with twisted strands 50 of metal wires twisted around a yielding core 52. As shown, each of the strands 50 is formed of three metal wires twisted together and wound around the yielding core 52, which is in the form of a twisted fibrous strand. In this case, as in the constructions described above, the core is preferably impregnated or coated with bonding material so that it will bond to the rubber of the tire casing through the openings between and around the strands 50.

The construction of Figure 12 is substantially like that of Figure 11 except that the core 54 is shown formed of metal wires twisted together and each of the outside strands is shown formed of two metal wires 56 and one non-metallic cord. Some of the non-metallic cords 58 are shown as being of fibrous material, while others 60 are shown as formed of rubber or plastic material. In use, all of the cords would preferably be formed of the same material, although they might be mixed as shown if desired. The non-metallic cords 58 and 60 preferably both carry bonding material as described above.

All of the constructions described above provide a tire having relatively thin walls for a given load carrying capacity and which is extremely flexible. In all cases, the tension elements are securely bonded to the rubber of the tire casing so that they will be held tightly in the tire and will not pull out as the tire is flexed. Each of the elements described is extremely flexible laterally and may be bent through a short radius so that the turn-ups around the bead reinforcements 16 may be of small diameter.

While several constructions embodying the invention have been illustrated and described in detail, it will be understood that these embodiments are for the purpose of illustration only and are not to be taken as a definition of the scope of the invention, reference being had for this purpose to the appended claims.

What is claimed is:

1. A tire casing comprising a tread and side walls and reinforced side beads, and having imbedded therein a number of layers of tensile elements arranged closely adjacent each other side by side in each layer, and extending diagonally around the tire from one bead through the side walls and tread to the other bead, each element comprising an elongated yielding core of small diameter relative to its length, and a plurality of strands of smaller diameter than the core braided around the core in a tubular braid with each strand crossing over and under other strands diagonally around the core throughout the full length of the element to leave interstices in the braid substantially equal in width to the diameter of the strands, and to provide an element which is resilient longitudinally in both tension and compression, some of said strands being metal wires.

2. A tire casing comprising a tread and side walls and reinforced side beads, and having imbedded therein a number of layers of tensile elements arranged closely adjacent each other side by side in each layer, and extending diagonally around the tire from one bead through the side walls and tread to the other bead, each element comprising an elongated yielding core of small diameter relative to its length, and a plurality of strands of smaller diameter than the core braided around the core in a tubular braid with each strand crossing over and under other strands diagonally around the core throughout the full length of the element to leave interstices in the braid substantially equal in width to the diameter of the strands, and to provide an element which is resilient longitudinally in both tension and compression, some of said strands being metal wires, the material of the tire casing being bonded to the core through the interstices of the braid around and between the strands.

3. A tire casing comprising a tread and side walls and reinforced side beads, and having imbedded therein a number of layers of tensile elements arranged closely adjacent each other side by side in each layer, and extending diagonally around the tire from one bead through the side walls and tread to the other bead, each element comprising an elongated yielding core of small diameter relative to its length, and a plurality of strands of smaller diameter than the core braided around the core in a tubular braid with each strand crossing over and under other strands diagonally around the core throughout the full length of the element to leave interstices in the braid substantially equal in width to the diameter of the strands, and to provide an element which is resilient longitudinally in both tension and compression, some of said strands being metal wires and others of the strands being of non-metallic yielding material.

4. A tire casing comprising a tread and side walls and reinforced side beads, and having imbedded therein a number of layers of tensile elements arranged closely adjacent each other side by side in each layer, and extending diagonally around the tire from one bead through the side walls and tread to the other bead, each element comprising an elongated yielding core of small diameter relative to its length, and a plurality of strands of smaller diameter than the core braided around the core in a tubular braid with each strand crossing over and under other strands diagonally around the core throughout the full length of the element to leave interstices in the braid substantially equal in width to the diameter of the strands, and to provide an element which is resilient longitudinally in both tension and compression, some of said strands being metal wires, and others of the strands being of non-metallic yielding material, the core and the non-metallic strands carrying bonding material to facilitate bonding of the material of the tire casing to the tension elements.

ROBERT C. PIERCE.